United States Patent [19]
Winchester

[11] Patent Number: 5,926,843
[45] Date of Patent: Jul. 27, 1999

[54] MOLDABLE LIMB PROTECTOR

[76] Inventor: Stanley Robert Winchester, 82 Natham Sq., Swan View, Australia, 6056

[21] Appl. No.: 08/974,715

[22] Filed: Nov. 19, 1997

[51] Int. Cl.$^6$ ..................................................... A61D 9/00
[52] U.S. Cl. ...................................... 2/22; 119/850; 54/82
[58] Field of Search .............................. 2/22, 24, 16, 59; 119/850; 54/82, 79.1

[56] References Cited

U.S. PATENT DOCUMENTS

| | | | |
|---|---|---|---|
| 3,791,383 | 2/1974 | Friedman | 128/154 |
| 5,115,627 | 5/1992 | Scott . | |
| 5,226,191 | 7/1993 | Mitchell | 2/24 |
| 5,676,094 | 10/1997 | Gun-Munro | 119/850 |
| 5,781,935 | 7/1998 | Bassett et al. | 2/24 |
| 5,784,715 | 7/1998 | Buchanan | 2/22 |

FOREIGN PATENT DOCUMENTS

| | | |
|---|---|---|
| 2063681 | 6/1981 | United Kingdom . |
| 2265812 | 10/1993 | United Kingdom . |
| WO 89/07915 | 9/1989 | WIPO . |

*Primary Examiner*—John J. Calvert
*Assistant Examiner*—Tejash D Patel

[57] ABSTRACT

A protective garment 10 for a limb, such as a limb of a horse, includes a covering 12 configured and dimensioned to wrap at least part way around the limb. A remoulded thermoplastic sheet 14 is retained within the covering 12. The covering 12 includes a front sheet 20 and a back sheet 22 which are fastened together about their periphery by a ribbon 24. The back sheet 22 is of a smaller size and the front sheet 20 is made of an elastic material. As a result, the bulk sheet 22 is in a stretched state when the garment 10 is unwrapped. When the garment 10 is applied to a limb, the back sheet 22 contracts onto the limb to form a substantial seal to prevent ingress of foreign material including water. The thermoplastic sheet 14 can be remoulded insitu, to a shape complimentary to a portion of the limb over which it is disposed. A foam sheet 28 is placed between the thermoplastic sheet 14 and back sheet 22 to provide improved cushioning and comfort. The garment 10 is held in place by the engagement of three strips of hook material 16 which are attached to the front sheet 20, with three tapes of loop material 18 which are attached at one end to the front sheet 20.

16 Claims, 1 Drawing Sheet

MOLDABLE LIMB PROTECTOR

The present invention is for a protective garment for a limb, and in particular, but not exclusively, to a protective garment for a limb of a horse.

In order to prevent injury it is highly desirable to protect the lower limbs of horses particularly during competitions and races. Several types of protective garments and boots are already known and available. The simplest form of garment is simply a bandage which is wound around a limb of a horse and attached onto itself typically by use of hook and loop fasteners. A more sophisticated type of garment is the PRO-SPORTS BOOTS made by Brumby Equestrian Products. This boot is in the form of a sheet of flexible material which wraps around the lower limb of a horse and is tailored to provide protection and support to a horses leg. The boot includes a number of straps provided on one side with a hook material which engages with a loop material covering the front surface of the boot. This type of boot is highly regarded in the industry and provides excellent support to the superficial and the digital flexor tendons and suspensory ligaments along with outstanding protection to the sesamoid bones.

It is an object of the present invention to provide an alternate type of protective garment with improved impact protection.

According to the present invention there is provided a protective garment for a limb, the garment including:
 a covering configured and dimensioned to wrap at least part way around a limb;
 a mouldable impact resistant material retained within said covering; and
 means for releasably fastening the garment onto itself to hold the garment onto the limb;
 whereby, in use, the mouldable impact resistant material can be remoulded insitu to a shape complementary to a portion of the limb over which it is disposed.

Preferably the covering includes a back sheet which contacts the limb when the garment is applied to the limb, the back sheet being made of an elastic material and held in a stretched state when the garment is in an unwound condition, so that when the garment is wrapped around the limb the back sheet contracts onto the limb to form a seal onto the limb to substantially prevent the ingress of foreign matter including water.

Preferably the covering includes a front sheet which is attached about its periphery to the back sheet, the back sheet being of a smaller size than the front sheet thereby placing the back sheet in the stretched state.

Preferably the covering is made of a waterproof material.

Preferably the back sheet is made of neoprene.

Preferably the front sheet is made of codura.

Preferably the back sheet and front sheet are attached together about their periphery by a ribbon which is folded along its length about the periphery of the covering so as to overlie the back sheet and front sheet on opposite sides of the fold.

Preferably the mouldable impact resistant material is made of a thermoplastic material.

Preferably the means for releasably fastening includes separate pieces of hook and loop fastener which are attached to the covering and configured so that when the garment is wrapped around a limb the pieces can be pushed onto each other so effect fastening.

Preferably one of the pieces of the hook and loop fastener is in the form of a strap which is fastened at one end to the covering so as to extend away from the covering.

Preferably the strap includes at least a length of elastic material.

An embodiment of the garment will now be described by way of example only with reference to the accompanying drawings in which.

Referring to the accompanying drawings a protective garment 10 for a limb, such as for example the limb of a horse, includes a covering 12 configured and dimensioned to wrap at least part way around the limb, a mouldable impact resistant material in the form of a thermoplastic sheet 14 which is retained within the covering 12 and, means, in the form of hook and loop fastener 16 and 18 respectively for releasably fastening the garment 10 onto itself to hold the garment onto the limb. In use, the thermoplastic sheet 14 can be remoulded insitu, to a shape complimentary to a portion of the limb over which it is disposed.

Figure 3:
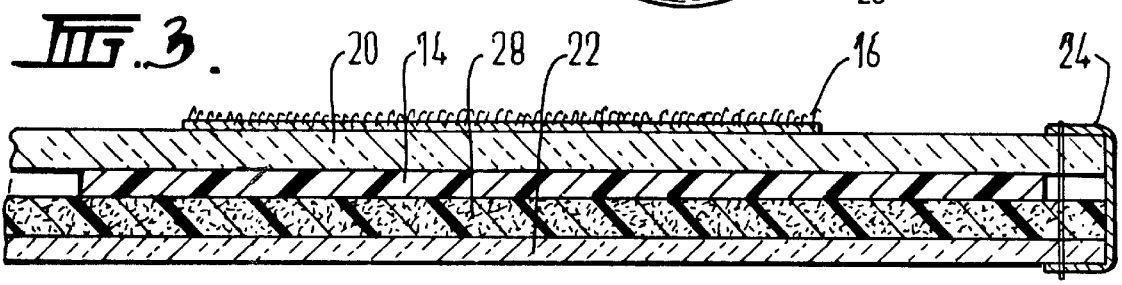
FIG. 3 is a view of section A of the garment shown in FIG. 1.

Looking more closely at the garment 10, it can be seen that the covering 12 includes a front sheet 20 and back sheet 22 (refer FIG. 3). The front and back sheets 20, 22 are of the same shape but the back sheet 22 is of a smaller size. Additionally, the back sheet 22 is made of an elastic material. The front and backs sheets 20, 22 are attached together about their periphery by a ribbon 24. As a result of this, the back sheet 22 is in a stretched state when the garment 10 is unwrapped or otherwise not fastened onto itself. Consequently, when the garment 10 is applied to a limb, the back sheet 22 contracts onto the limb to form a substantial seal to prevent the ingress of foreign material including water.

In order to improve cushioning and comfort, a sponge or foam sheet 28 is disposed between the back sheet 22 and the thermoplastic sheet 14. The foam sheet 28 is of the same size and shape as the front sheet 20.

The ribbon 24 is folded in the direction of this length and extends about the periphery of the covering 12 so as to overlie on opposite sides of the fold the front sheet 20 and the back sheet 22. In this embodiment, the ribbon 24 is stitched in place to hold the front sheet 20, back sheet 22 and foam sheet 28 together. Although other types of attachment can be used such as adhesives.

It will be seen that a bottom portion of the garment 10 is formed with a centrally located convex depending lip 26. For convenience of manufacture, the ribbon 24 can be formed of two separate lengths, one of which extends along the bottom portion across the lip 26 and the other length extending about the periphery of the remainder of the covering 12.

The thermoplastic sheet 14 is initially in the shape of a rectangle and disposed between the front sheet 20 and the foam sheet 28. It is preferred that during the manufacturing process, once the thermoplastic sheet 14 has been placed inside the covering 12, that the sheet 14 is premoulded to a standard shape which would fit the limbs of a large number of horses. However, in order to customise the garment 10 for any particular horse, the thermoplastic sheet 14 can be remoulded by simply placing the garment 10 in hot water until the sheet 14 is in a pliable state then, removing the garment 10 from the water, drying the garment and wrapping it around the horses limb and fastening it in place by use of the hook and loop fasteners 16, 18. The garment 10 can then be cooled by hosing it with cold water. Upon cooling, the thermoplastic sheet 14 will be moulded to a shape complimentary to the part of the limb over which it was disposed during the remoulding process.

The hook fastener 16 is in the form of three separate lengths of hook material which are stitched about their periphery to the front sheet 20 and located near one side of the garment 10. The loop material 18 is in the form of three lengths of tape each of which is fastened at one end to the front sheet 20 and extend away from the covering 12. Each tape 18 is parallel to a corresponding length of hook fastener 16. Therefore, when the garment 12 is wrapped around a limb, the tapes 18 overlie corresponding lengths of hook fastener 16 so that they can be pushed thereonto to effect fastening of the garment 10 onto itself and onto the limb. If desired, the whole or part of the length of each tape 18 can be formed of an elastic material.

Figure 1:
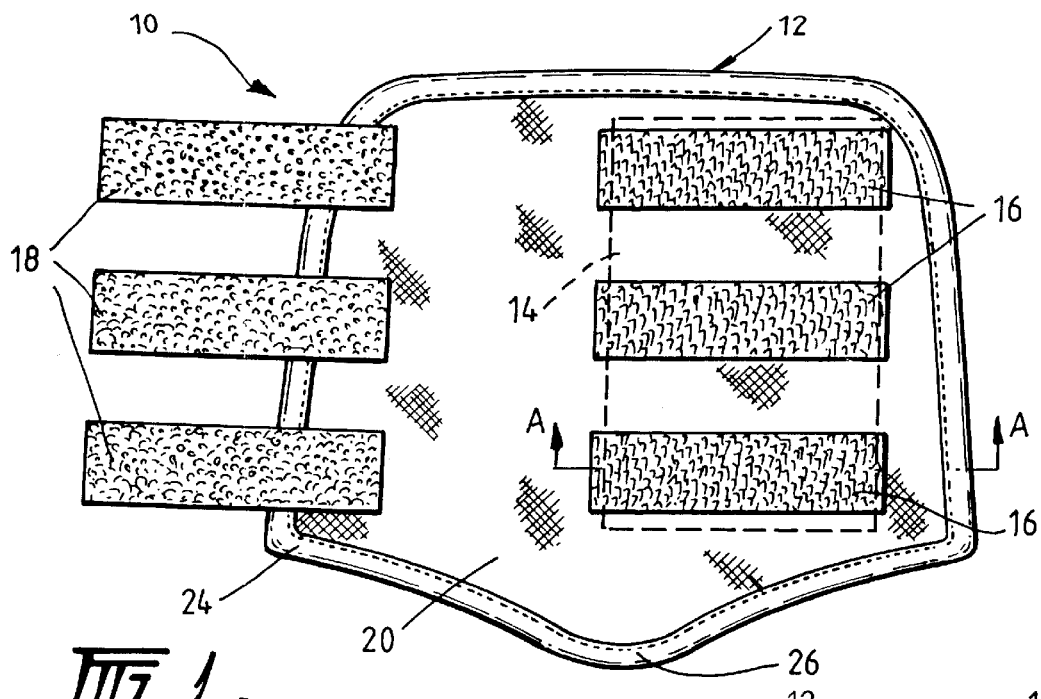
FIG. 1 is a front plan view of one embodiment of the garment.
Figure 2:
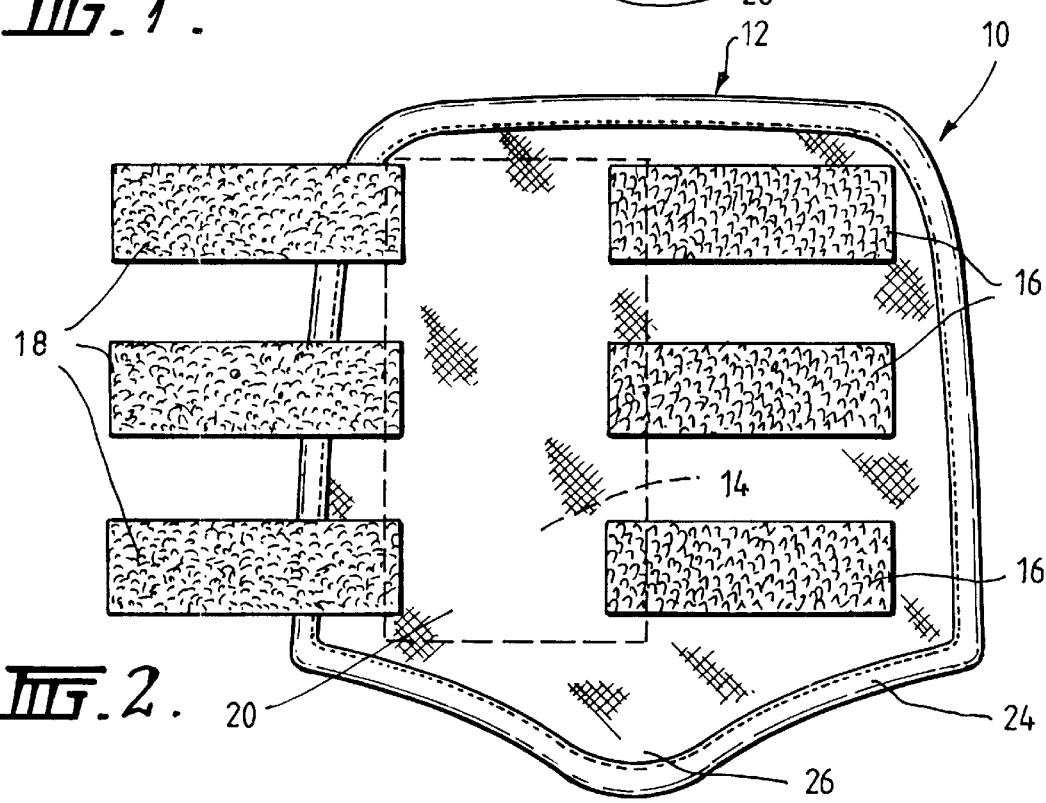
FIG. 2 is a front plan view of a second embodiment of the garment.

The embodiment of the garment 10 shown in FIG. 1 is adapted for application to a front leg of a horse so that the thermoplastic sheet 14 lies over the back of the front legs to cover the suspensory ligament. The embodiment shown in FIG. 2 differs from the embodiment shown in FIG. 1 only in the location of the thermoplastic sheet 14 within the covering 12. In FIG. 2, the thermoplastic sheet 14 is disposed on the left hand side of the covering 12 whereas in FIG. 1, the sheet 14 is on the right hand side. The embodiment shown in FIG. 2 is particularly suited the application on the hind leg of a horse. In both cases, the sheet 14 is held in place by forming one or two tucking stitches (ie a line of three or four stitches) through the front sheet 20 and sheet 14.

In one preferred form of the garment 10, the front sheet 20 is made of CODURA material; the back sheet 22 is made of 3 mm thick neoprene covering with a nylon jersey and the foam layer or sheet 28 is made of polyethurane 45 of 5 mm thickness. Typically the thermoplastic sheet 14 has a thickness of 3.2 mm. The ribbon 24 is in the form of a 32 mm wide polyproperlene webbing.

Now that the embodiments of the present invention have been described in detail it will be apparent to those skilled in the relevant arts that numerous modifications and variations may be made without departing from the basic inventive concepts. For example, the size and shape of the thermoplastic sheet 14 can be varied to suit the application of the garment 10. Also, different fastening arrangements can be incorporated such as the provision of a area of loop material on the back sheet 22 which will overlie the hook material 16 when the garment 10 is wrapped around a limb. Also the overall shape of the garment 10 can be varied to suit the application. In addition, the specific types of material used for the front sheet 20 back sheet 24 and foam sheet 28 can vary from that described in relation to the preferred embodiments. Although, it is preferred that the back sheet 22 be made of an elastic material and of a size smaller than that of a front sheet 20 so that it is in a stretched state. It will also be realised that the garment 10 can in fact be applied animals other than horses including humans.

All such modifications and variations are deemed to be within the scope of the present invention the nature of which is to be determined from the foregoing description.

I claim:

1. A protective garment for a limb, the garment including:

a covering configured and dimensioned to wrap at least part way around a limb;

a moldable impact resistant material retained within said covering, the moldable impact resistant material being moldable insitu to a shape complementary to a portion of the limb over which the impact resistant material is disposed; and means for releasably fastening the garment onto itself to hold the garment onto the limb.

2. A garment according to claim 1 wherein the covering includes a back sheet which contacts the limb when the garment is applied to the limb, the back sheet being made of an elastic material and held in a stretched state when the garment is in an unwound condition, so that when the garment is wrapped around the limb the back sheet contracts onto the limb to form a seal onto the limb to substantially prevent the ingress of foreign matter including water.

3. A garment according to claim 2 wherein the covering includes a front sheet which is attached about its periphery to the back sheet, the back sheet being of a smaller size than the front sheet thereby placing the back sheet in the stretched state.

4. A garment according to claim 3 wherein the covering is made of a waterproof material.

5. A garment according to claim 4 wherein the back sheet is made of neoprene.

6. A garment according to claim 5 wherein the front sheet is made of codura.

7. A garment according to claim 3 wherein the back sheet and front sheet are attached together about their periphery by a ribbon which is folded along its length about the periphery of the covering so as to overlie the back sheet and front sheet on opposite sides of the fold.

8. A garment according to claim 1 wherein the mouldable impact resistant material is made of a thermoplastic material.

9. A garment according to claim 1 wherein the means for releasably fastening includes separate pieces of hook and loop fastener which are attached to the covering and configured so that when the garment is wrapped around a limb the pieces can be pushed onto each other to effect fastening.

10. A garment according to claim 9 wherein one of the pieces of the hook and loop fastener is in the form of a strap which is fastened at one end to the covering so as to extend away from the covering.

11. A garment according to claim 10 wherein the strap includes at least a length of elastic material.

12. A protective garment for a limb, the garment including:

a covering configured and dimensioned to wrap at least part way around a limb, the covering including a back sheet which contacts the limb when the garment is applied to the limb and a front sheet which is attached about its periphery to the back sheet, the back sheet being made of an elastic material and being of a smaller size than the front sheet thereby placing the back sheet in a stretched state when the garment is in an unwound condition, such that when the garment is wrapped around the limb the back sheet contracts onto the limb to form a seal onto the limb to substantially prevent the ingress of foreign matter including water;

a moldable impact resistant material retained within said covering; and means for releasably fastening the garment onto itself to hold the garment onto the limb.

13. A garment according to claim 12, wherein the covering is made of a waterproof material.

14. A garment according to claim 12, wherein the back sheet is made of neoprene.

15. A garment according to claim 12, wherein the front sheet is made of codura.

16. A garment according to claim 12, wherein the back sheet and front sheet are attached together about their periphery by a ribbon which is folded along its length about the periphery of the covering so as to overlie the back sheet and front sheet on opposite sides of the fold.

\* \* \* \* \*